United States Patent [19]
Heier, Jr.

[11] 3,730,328
[45] May 1, 1973

[54] CONVEYOR SYSTEM

[75] Inventor: Richard F. Heier, Jr., Lansing, Ill.

[73] Assignee: United States Steel Corporation, Pittsburgh, Pa.

[22] Filed: Dec. 10, 1971

[21] Appl. No.: 206,763

[52] U.S. Cl..........................198/44, 198/53, 198/69, 214/14
[51] Int. Cl................................................B65g 47/42
[58] Field of Search..............................214/17 C, 14; 198/44, 45, 53, 68, 69

[56] References Cited

UNITED STATES PATENTS 1,396,193  11/1921  Godin...................................214/14
3,057,454  10/1962  Frasch et al..........................198/45

Primary Examiner—Robert G. Sheridan
Attorney—Robert J. Leek, Jr.

[57] ABSTRACT

A conveyor system for handling granular material includes a first conveyor, and a hopper adjacent the discharge end of the first conveyor for receiving the material from the first conveyor and delivering it to a second conveyor. The top surface of the hopper slopes downwardly away from the first conveyor and a hopper extension having its bottom also sloping downwardly away from the first conveyor is mounted on a track sloping downwardly from the first conveyor. The top of the hopper extension is substantially larger than the top of the hopper.

9 Claims, 4 Drawing Figures

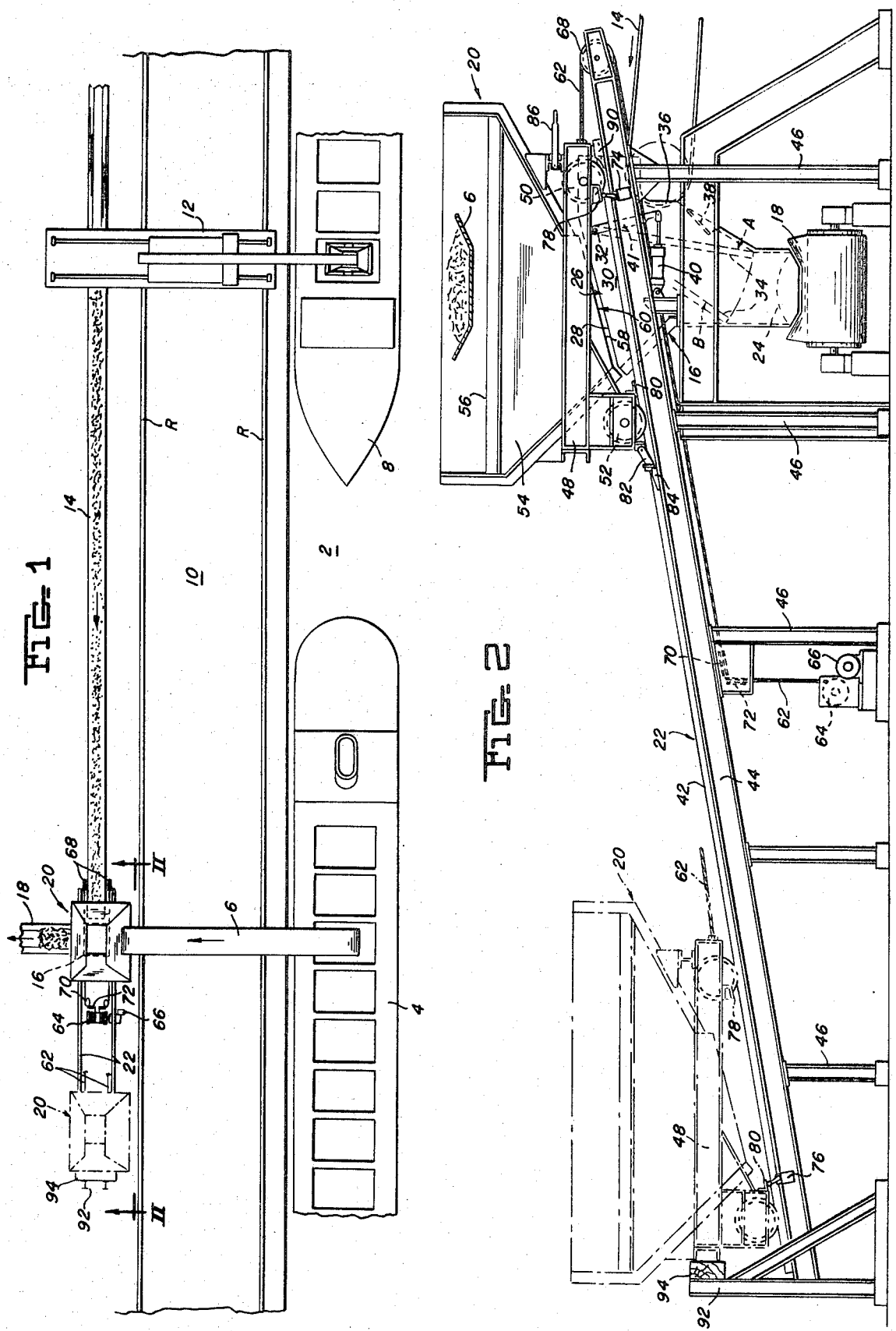

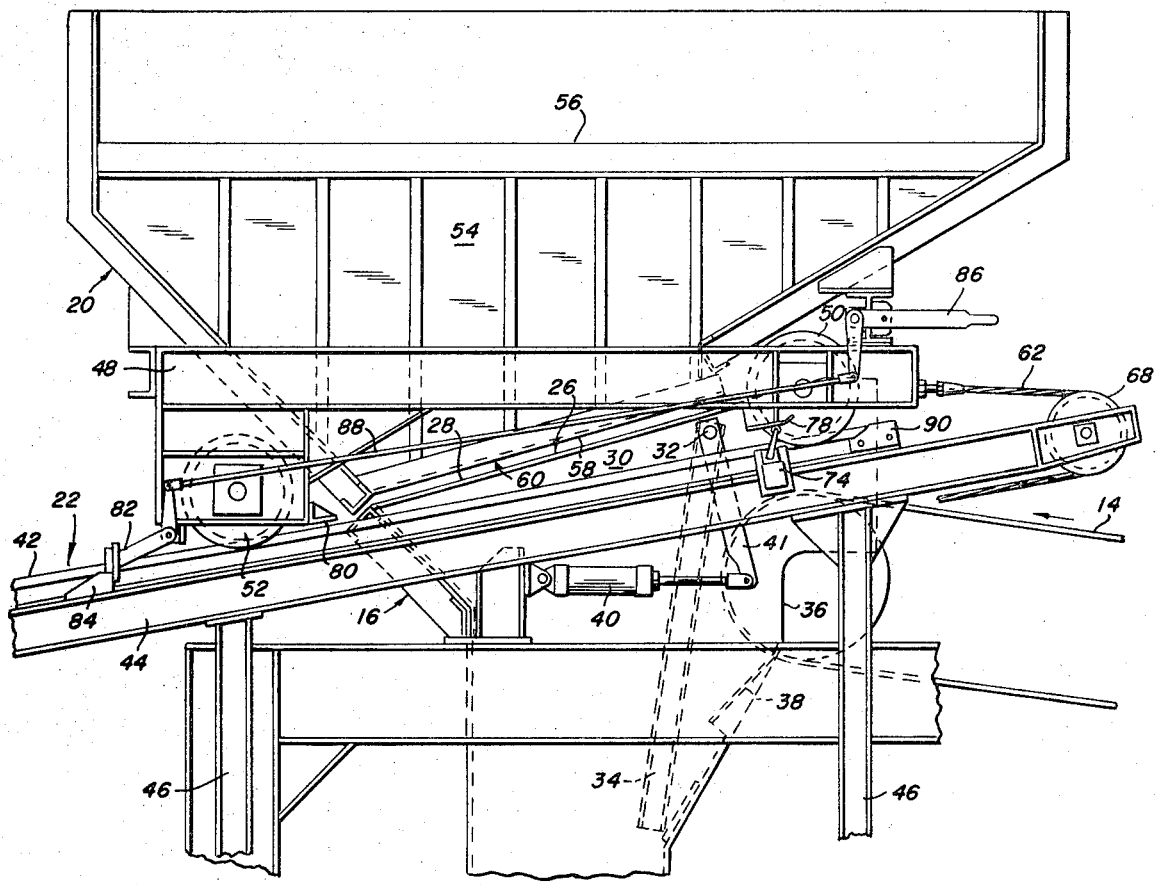
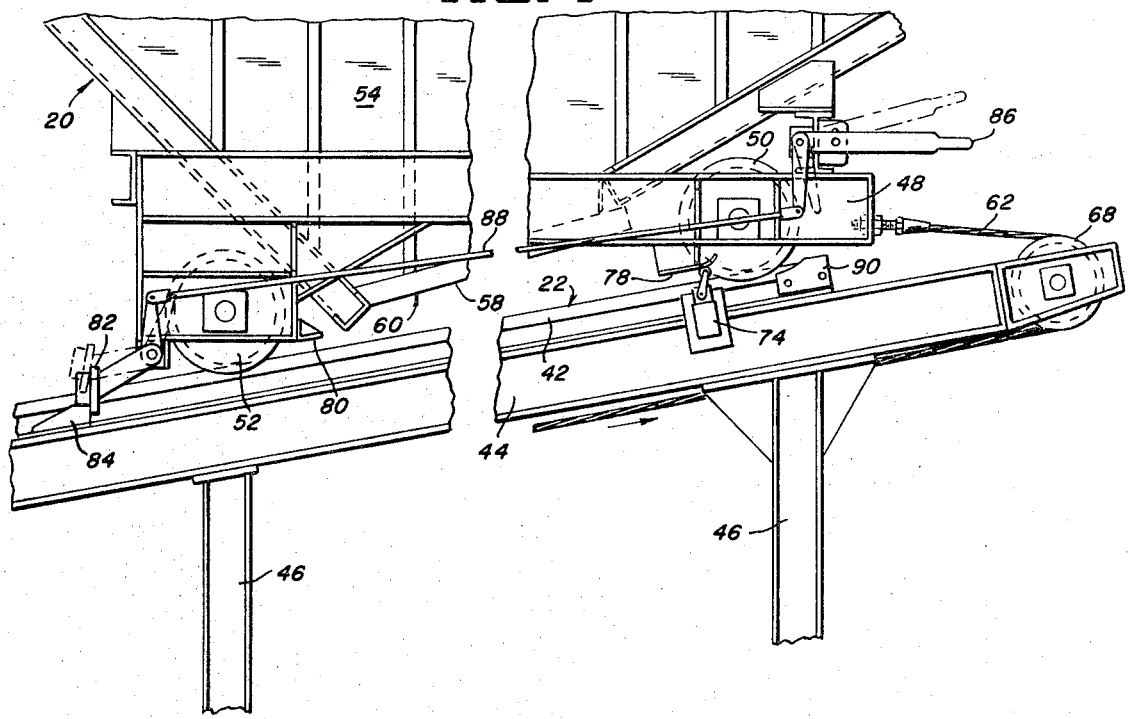

CONVEYOR SYSTEM

This invention relates to a conveyor system and more particularly to a conveyor system for handling granular material such as iron ore or pellets. Many steel plants are located along water ways and iron ore is commonly delivered to the plants by means of boats which pull up along the dock in the boat slip. The ore boats may be self-unloaders which include conveyors to deliver the ore in a steady stream to the land or they may be of the type which are unloaded by means of buckets carried by crane-like structures such as Hulett unloaders. The Hulett unloaders remove ore from the hold of the boat and deposit it on a conveyor parallel to the boat slip. The ore is discharged from this conveyor through a hopper to a second conveyor which carries the ore away from the boat slip for storage. For various reasons a hopper of sufficient size for receiving ore from the first conveyor and delivering it to the second conveyor is not large enough to deliver ore efficiently from the self-unloader boat conveyor to the second conveyor. Travel of the Hulett unloaders which straddle and travel in the same direction as the first conveyor precludes increasing the height of the hopper to receive the pellets from the boat's unloading conveyor; and the hopper can not be widened without protruding into a roadway between the boat slip and first conveyor.

It is therefore an object of my invention to provide a conveyor system which permits efficient delivery of granular material from two different sources to a single conveyor.

Another object is to provide such a conveyor system which can be rapidly and easily switched from one delivery arrangement to the other.

These and other objects will be more apparent after referring to the following specification and attached drawings, in which:

FIG. 1 is a schematic plan view showing the arrangement of the conveyor system;

FIG. 2 is a view taken on the line II—II of FIG. 1;

FIG. 3 is an enlarged view of the top portion of FIG. 2; and

FIG. 4 is an enlarged fragmentary view of the hopper extension.

Referring more particularly to the drawings, reference numeral 2 indicates a boat slip with a self-unloading boat 4 therein. The boat 4 includes an ore conveyor 6 which unloads the boat. A second boat 8 which is not self-unloading is also in the boat slip 2. A roadway 10 is arranged along side the slip 2 and a Hulett unloader 12 traveling on rails R spans the roadway and extends over boat 8. The conveyor system of my invention includes a first conveyor 14 parallel to rails R. A hopper 16 is positioned at the discharge end of conveyor 14 and delivers ore to a second conveyor 18 which moves the ore to storage. The conveyor 18 is generally horizontal, but preferably slopes upwardly towards its discharge end. A hopper extension 20 is mounted on a track 22 which slopes downwardly away from the hopper 16. When the hopper extension is in its upper position it can receive ore from conveyor 6 for delivery to conveyor 18.

The hopper 16 has a bottom opening 24 and a top opening 26 of substantially greater size than opening 24. Top surface 28 formed by end walls 30 of the hopper 16 slopes downwardly away from the side adjacent conveyor 14 at an angle shown as 15°. A horizontal pivot shaft 32 extends between and is supported by hopper end walls 30 adjacent their upper ends. A plate or gate 34 attached to shaft 32 is movable about the axis of the shaft. An opening 36 is provided in the side of said hopper 16 adjacent conveyor 14. A deflector plate 38 is positioned below the opening 36. A fluid motor 40 connected by an arm 41 to shaft 32 moves the gate 34 between position A (FIG. 2) where it closes opening 36 and position B where it permits discharge from conveyor 14 to hopper 16.

Track 22 comprises a pair of spaced apart rails 42 each mounted on spaced apart beams 44 mounted on columns 46. The upper ends of beams 44 extend beyond the discharge end of conveyor 14. The track 22 is arranged at a smaller angle (shown as 10°) than the top surface 28 of the hopper. The hopper extension 20 includes a rectangular frame 48 which has a pair of upper wheels 50 and a pair of lower wheels 52 secured thereto. The wheels are mounted on rails 42. A hopper section 54 is mounted on frame 48 and has a top opening 56 of substantially larger size than opening 26 and a bottom opening 58 of smaller size than opening 26 so that there is a peripheral space between the sides and ends of openings 58 and 26. Bottom surface 60 of hopper extension 20 is spaced a short distance above top surface 28 of hopper 16 and slopes downwardly away from the side adjacent conveyor 14 at preferably the same angle as surface 28.

The hopper extension 20 is moved along the track 22 by means of transversely spaced wire ropes 62 having one end connected to frame 48 and their other end secured on a drum 64 which is rotatable by motor 66. Each rope 62 is directed in its travel by means of a sheave 68 mounted on the upper end of each beam 44, and sheaves 70 and 72 mounted on the supporting framework of the track. Over-travel switches 74 and 76 are preferably mounted adjacent the top and bottom of beams 44 and are operable by cams 78 and 80, respectively, mounted on hopper extension 20. A pair of locking devices 82, one on each side of hopper extension 20 are adapted to engage chocks or stops 84 one on each beam 44. The locking devices 82 are operable by handles 86 through linkage 88. A pair of rail stops 90 mounted one on each beam 44 limits upward travel of hopper extension 20. A back-stop assembly 92 extending between the lower ends of beams 44 supports a wooden bumper 94 in position to engage frame 48.

In operation, when it is desired to unload the self-unloading boat 4, conveyor 14 is stopped and the operator operates motor 40 to move gate 34 to position A so as to block off opening 36. The operator now pushes an "up" button (not shown) which energizes winch motor 66 to reel in ropes 62 around drum 64, thus pulling hopper extension 20 upwardly past over-travel switch 74 and against rail stops 90. The operator then moves handle 86 to lower the locking devices 82 from the broken line position (FIG. 4) to their locking position shown in full lines. The operator then pushes the "down" button (not shown) to relieve the tension on ropes 62 to allow hopper extension 20 to back down a minute distance until locking devices 82 bear against chocks 84. The hopper extension 20 is now in its precese position to receive the ore pellets, the bottom opening 58 of hopper extension 20 being in its preset operating position within the perimeter and above the top opening 26 of fixed hopper 16. The conveyor 6 is then extended from boat 4 over hopper extension 20 and ore is delivered from the conveyor onto the hopper extension.

After unloading of boat 4 is completed and it is desired to unload boat 8 the operator pushes the "up" button momentarily to place tension on wire ropes 62 and move wheels 50 against rail stops 90 so that the locking devices 82 are positioned away from chocks 84. Handle 86 is then operated to raise the locking devices 82 clear of the chocks. To lower hopper extension 20, the operator pushes the "down" button which reverses winch motor 66 and the hopper extension 20, aided by gravity, eases down track 22 past over-travel switch 76 which shuts off motor 66. Travel stops when the end of frame 48 rests against bumper 94. Motor 40 is then operated to move gate 34 to position B (FIG. 2). Because the angle of slope of the top surface 28 of hopper 16 and the bottom surface 60 of hopper extension 20 are substantially equal and greater than the angle of slope of track 22, the space between these surfaces will increase as the hopper extension 20 moves downwardly. This prevents jamming due to ore caught between these surfaces. The system is then ready to receive ore from conveyor 14. In this position the top of hopper extension 20 is below the bridge of Hulett unloaders 12 so that one or more of the Hulett unloaders can move past the hopper 16 to unload boats further up the slip and/or to move further down the slip as needed.

While one embodiment of my invention has been shown and described, it will be apparent that other adaptations and modifications may be made without departing from the scope of the following claims.

I claim:

1. A conveyor system for handling granular material comprising a first conveyor having a discharge end, a hopper adjacent said discharge end adapted to receive material from said first conveyor, said hopper having a top opening surrounded by a top surface, a second conveyor beneath said hopper adapted to receive material from said hopper, a track sloping downwardly from a location adjacent said hopper to a position remote therefrom, a hopper extension mounted for movement on said track between an upper position above said hopper and a lower inoperative position, said hopper extension having top and bottom openings with its bottom opening being no larger than the top opening of said hopper and its top opening being substantially larger than its bottom opening, and means for moving said hopper extension between the upper and lower positions.

2. A conveyor system according to claim 1 in which the bottom surface of said hopper extension and the upper surface of said hopper slope downwardly away from the side adjacent said first conveyor at an angle greater than that of the slope of said track.

3. A conveyor system according to claim 1 including a side opening in said hopper adjacent said conveyor, a gate pivotally mounted on a generally horizontal transverse axis adjacent said first conveyor and extending downwardly from said axis, means for moving said gate about said axis between a first position with its bottom adjacent the side of said hopper remote from said first conveyor and a second position closing said side opening.

4. A conveyor system according to claim 3 in which the bottom surface of said hopper extension and the upper surface of said hopper slope downwardly away from the side adjacent said first conveyor at an angle greater than that of the slope of said track.

5. A conveyor system according to claim 2 including means for locking said hopper extension in said upper position with its lower opening in alignment with the upper opening in said hopper.

6. A conveyor system according to claim 5 including a side opening in said hopper adjacent said conveyor, a gate pivotally mounted on a generally horizontal transverse axis adjacent said first conveyor and extending downwardly from said axis, means for moving said gate about said axis between a first position with its bottom adjacent the side of said hopper remote from said first conveyor and a second position closing said side opening.

7. A conveyor system according to claim 1 including means for locking said hopper extension in said upper position with its lower opening in alignment with the upper opening in said hopper.

8. A conveyor system according to claim 7 including a side opening in said hopper adjacent said conveyor, a gate pivotally mounted on a generally horizontal transverse axis adjacent said first conveyor and extending downwardly from said axis, means for moving said gate about said axis between a first position with its bottom adjacent the side of said hopper remote from said first conveyor and a second position closing said side opening.

9. A conveyor system for handling granular material comprising a first conveyor having a discharge end, a hopper adjacent said discharge end and adapted to receive material from said first conveyor, said hopper having a top opening surrounded by a top surface sloping downwardly away from the side adjacent said conveyor and a side opening adjacent said conveyor, a gate pivotally mounted on a generally horizontal transverse axis adjacent said first conveyor and extending downwardly from said axis, means for moving said gate about said axis between a first position with its bottom adjacent the side of said hopper remote from said first conveyor and a second position closing said side opening, a second conveyor beneath said hopper and adapted to receive material from said hopper, said second conveyor being arranged generally transversely to said first conveyor, a track sloping downwardly from said hopper away from said first conveyor, a hopper extension mounted for movement on said track between an upper position above said hopper and a lower inoperative position, said hopper extension having top and bottom openings with its bottom opening being smaller than the top opening of said hopper and its top opening being substantially larger than its bottom opening, the bottom opening of said hopper extension being surrounded by a bottom surface sloping downwardly away from the side adjacent said first conveyor at an angle substantially the same as the top surface of said hopper and at an angle greater than that of the slope of said track, means for moving said hopper extension between its upper and lower positions, and means for locking said hopper extension in said upper position with its lower opening in alignment with the upper opening in said hopper.

* * * * *